(12) United States Patent
Santi

(10) Patent No.: US 10,086,966 B2
(45) Date of Patent: Oct. 2, 2018

(54) FOLDING UNIT FOR POURABLE FOOD PRODUCT PACKAGING MACHINES

(71) Applicant: TETRA LAVAL HOLDINGS & FINANCE S.A., Pully (CH)

(72) Inventor: Franco Santi, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 545 days.

(21) Appl. No.: 14/654,429

(22) PCT Filed: Nov. 29, 2013

(86) PCT No.: PCT/EP2013/075139
§ 371 (c)(1),
(2) Date: Jun. 19, 2015

(87) PCT Pub. No.: WO2014/095309
PCT Pub. Date: Jun. 26, 2014

(65) Prior Publication Data
US 2015/0344163 A1  Dec. 3, 2015

(30) Foreign Application Priority Data

Dec. 21, 2012 (EP) .................................... 12198834

(51) Int. Cl.
*B65B 61/24* (2006.01)
*B65B 61/28* (2006.01)
(Continued)

(52) U.S. Cl.
CPC .............. *B65B 61/24* (2013.01); *B65B 61/28* (2013.01); *B65G 17/46* (2013.01); *B65G 47/252* (2013.01);
(Continued)

(58) Field of Classification Search
CPC ......... B65B 61/24; B65B 61/28; B65B 35/24; B65G 17/323; B65G 17/46; B65G 2201/0235; B65G 2201/025
(Continued)

(56) References Cited

U.S. PATENT DOCUMENTS 1,465,976 A * 8/1923 Faull ....................... B65B 35/24
  53/372.4
2,321,644 A * 6/1943 Billstrom ............. B27M 3/0033
  144/245.3
(Continued)

FOREIGN PATENT DOCUMENTS

CN       1721276 A    1/2006
CN     101397006 A    4/2009
(Continued)

OTHER PUBLICATIONS

EPO machine translation of DE102008004437, retrieved from espacenet.com, Oct. 30, 2017, 23 pages.*
(Continued)

*Primary Examiner* — Stephen F Gerrity
(74) *Attorney, Agent, or Firm* — Buchanan Ingersoll & Rooney PC

(57) ABSTRACT

A folding unit for producing packages of pourable food products from sealed packs comprises a movable conveying member and a folding device arranged for folding at least one end portion of the packs, whilst the packs are conveyed by the conveying member, to obtain the packages, the conveying member carrying a plurality of plates, each plate being configured to receive a pack and to deliver a package to a transferring and up-ending unit arranged downstream of the folding unit, the folding unit further comprising a retention device arranged for keeping said packages on the plates.

14 Claims, 4 Drawing Sheets

(51) Int. Cl.
*B65G 17/46* (2006.01)
*B65B 47/84* (2006.01)
*B65G 47/252* (2006.01)

(52) U.S. Cl.
CPC .... *B65G 47/846* (2013.01); *B65G 2201/0235* (2013.01)

(58) Field of Classification Search
USPC ................ 53/372.4, 372.5; 198/470.1, 803.3
See application file for complete search history.

(56) References Cited

U.S. PATENT DOCUMENTS

| | | | | |
|---|---|---|---|---|
| 2,667,958 | A * | 2/1954 | Malhiot | B65B 35/24 198/417 |
| 2,682,330 | A * | 6/1954 | Thomas | B65G 17/323 198/403 |
| 3,517,477 | A * | 6/1970 | Thornton | B65B 19/32 198/470.1 |
| 3,621,984 | A * | 11/1971 | Grassauer | B65G 17/46 198/803.7 |
| 3,809,210 | A | 5/1974 | Anderson | |
| 4,425,996 | A * | 1/1984 | Hoffmann | B65G 17/323 198/803.7 |
| 4,614,079 | A * | 9/1986 | Ida et al. | B65B 3/025 53/372.3 |
| 4,654,227 | A * | 3/1987 | Cornellier | B23K 3/0676 118/423 |
| 4,936,440 | A * | 6/1990 | Focke et al. | B65B 35/46 198/427 |
| 5,031,385 | A * | 7/1991 | Wada | B65B 61/24 53/376.6 |
| 5,697,490 | A * | 12/1997 | Raque | B65G 17/48 198/470.1 |
| 5,765,677 | A * | 6/1998 | Ghini et al. | B65B 11/40 131/94 |
| 5,836,143 | A * | 11/1998 | Yoshida et al. | B65B 61/24 198/832 |
| 5,852,919 | A | 12/1998 | Matsuda et al. | |
| 5,966,899 | A * | 10/1999 | Fontanazzi | B65B 7/20 53/374.7 |
| 6,186,313 | B1 * | 2/2001 | Spatafora et al. | B65B 19/04 198/474.1 |
| 6,286,657 | B1 | 9/2001 | Schnabel | |
| 7,089,717 | B2 * | 8/2006 | Guttinger et al. | B65B 5/068 53/251 |
| 8,951,177 | B2 * | 2/2015 | Ford | B65B 43/325 493/181 |
| 2004/0221549 | A1 | 11/2004 | Guttinger et al. | |
| 2005/0103605 | A1 | 5/2005 | Hartness et al. | |
| 2009/0096283 | A1 | 4/2009 | Nishikawa et al. | |
| 2009/0113848 | A1 * | 5/2009 | Santi | B65B 7/18 53/374.7 |
| 2009/0116950 | A1 | 5/2009 | Sirocchi | |
| 2009/0193763 | A1 * | 8/2009 | Fontanazzi et al. | B65B 49/08 53/456 |
| 2014/0283489 | A1 | 9/2014 | Zhu | |

FOREIGN PATENT DOCUMENTS

| | | | | |
|---|---|---|---|---|
| CN | 102514773 A | | 6/2012 | |
| DE | 3621383 C1 * | | 12/1987 | .......... B65G 17/323 |
| DE | 100 54 629 A1 | | 5/2002 | |
| DE | 203 20 380 U1 | | 6/2004 | |
| DE | 10 2008 004437 A1 | | 4/2009 | |
| EP | 0 444 229 A1 | | 9/1991 | |
| EP | 0 819 605 A2 | | 1/1998 | |
| EP | 1 616 796 A1 | | 1/2006 | |
| EP | 2 660 159 A1 | | 11/2013 | |
| GB | 1109851 A * | | 4/1968 | ............ B65B 61/24 |
| JP | 2010-168071 A | | 8/2010 | |
| WO | WO 2007039163 A1 * | | 4/2007 | ............ B65G 17/46 |
| WO | 2007/119147 A2 | | 10/2007 | |
| WO | WO 2007/135079 A1 | | 11/2007 | |

OTHER PUBLICATIONS

Office Action (First Office Action) dated Aug. 21, 2017, by the Japanese Patent Office in corresponding Japanese Patent Application No. 2015-548319, and a partial English Translation of the Office Action. (6 pages).

Office Action dated Jun. 13, 2016, by the Chinese Patent Office in corresponding Chinese Patent Application No. 201380054526.1 and English translation of the Office Action. (9 pages).

International Search Report (PCT/ISA/210) dated Apr. 25, 2014, by the European Patent Office as the International Searching Authority for International Application No. PCT/EP2013/075139, 4 pages.

Written Opinion (PCT/ISA/237) dated Apr. 25, 2014, by the European Patent Office as the International Searching Authority for International Application No. PCT/EP2013/075139, 6 pages.

European Search Report for EP 12198834.9 dated May 21, 2015, 4 pages.

* cited by examiner

FOLDING UNIT FOR POURABLE FOOD PRODUCT PACKAGING MACHINES

TECHNICAL FIELD

The present invention relates to a folding unit for packaging machines for continuously producing sealed packages of pourable food products from a tube of packaging material.

BACKGROUND OF INVENTION

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is filled continuously downwards with the sterilized or sterile-processed food product, and is sealed and then cut along equally spaced cross sections to form pillow packs, which are then fed to a folding unit to form the finished packages, e.g. substantially parallelepiped-shaped packages.

More specifically, the pillow packs substantially comprise a parallelepiped-shaped main portion; and opposite top and bottom end portions projecting laterally on opposite sides of the main portion and defining respective triangular end flaps to be folded onto the main portion.

A longitudinal sealing strip, formed when sealing the packaging material to form the vertical tube, extends along the pillow packs; and the end portions of each pillow pack have respective transverse sealing seams perpendicular to the relative longitudinal sealing strip and defining respective end tabs projecting from the top and bottom of the pack.

The end portions of each pillow pack taper towards the main portion from the respective end tabs, and are pressed towards each other by the folding unit to form flat opposite end walls of the pack, while at the same time folding the end flaps onto respective walls of the main portion.

Packaging machines of the above type are known which comprises;
a folding unit where pillow packs are turned into folded packages by folding means; and
a transferring and up-ending unit for tipping the folded packages.

The folding unit substantially comprises:
a chain conveyor feeding the pillow packs along a forming path from a supply station to an output station;
a fixed elongated guide member, which is positioned facing and at a distance from the chain conveyor and cooperates cyclically with each pillow pack to flatten a first end portion of the pillow pack and so fold respective tab onto such first end portion; and
folding elements cooperating cyclically with each pillow pack to flatten a second end portion of the pillow pack and so fold respective tab onto such second end portion.

The transferring and up-ending unit is arranged downstream from the folding unit.

The transferring and up-ending unit transfers the packages successively along a conveying path from an in-feed station to an out-feed station, and simultaneously up-ends the packages from an in-feed position, in which the packages are positioned with their axis tilted to the horizontal, into an out-feed position, in which the packages are positioned with their axis substantially vertical.

The transferring and up-ending unit receives the packages at the in-feed station from the chain conveyor of the folding unit, and feeds them to a further conveyor at the out-feed station.

More specifically, the chain conveyor supplies the unit with packages in the in-feed position, and the further conveyor withdraws the packages from the unit in the out-feed position.

The transferring and up-ending unit substantially comprises a rotary member having a number of push arms which cooperate with respective packages to remove the packages from the folding unit and push the packages along the conveying path. The transferring and up-ending unit further comprises a fixed guide extending substantially along the conveying path and cooperating with the packages to ease them from the tilted in-feed position to the out-feed position.

More specifically, the conveying path along which the packages are fed is substantially in the form of an arc of circumference, at the end of which, the packages are fed to the further conveyor.

A drawback of the known packaging machines is that it may be difficult to control the transfer of the packages from the folding unit to the transferring and up-ending unit, especially at high output rates of the packaging machines, i.e. when the packages are advanced at high speed.

If the packages carried by the chain conveyor of the folding unit are not in the right position when the push arms of the transferring and up-ending unit interact with them, the push arms are not able to remove the packages from the folding unit in the proper way. In this case, package jams may occur that lead to packaging machine stops, and so to a reduction of the packaging machine efficiency.

DISCLOSURE OF INVENTION

An object of the invention is to improve the known packaging machines.

Another object of the invention is to improve the way in which packages are transferred from the folding unit to the transferring and up-ending unit in a packaging machine.

A further object of the invention is to provide a folding unit for a packaging machine which allows the position of the packages to be properly controlled, before and during transferring of the packages to the transferring and up-ending unit.

According to the invention, there is provided a folding unit for producing packages of pourable food products from sealed packs, comprising a movable conveying member and folding means arranged for folding at least one end portion of said packs, whilst said packs are advanced by said conveying member, to obtain said packages, said conveying member carrying a plurality of plates, each plate being configured to receive a pack and to deliver a package to a transferring and up-ending unit arranged downstream of the folding unit, characterized in that the folding unit further comprises retention means arranged for keeping said packages on said plates.

Owing to the inventions, the packages are prevented from falling down from the plates before, and during, transferring from the folding unit to the transferring and up-ending unit. The packages, even in case the folding unit is driven at a very high production speed, i.e. at high output rate of the packaging machine, are prevented from sliding downwards along the plates and causing jams in the region interposed between the folding unit and the transferring and up-ending unit.

In addition, since the packages are kept on the plates and therefore do not fall down from the plates by gravity, the transferring and up-ending unit may be arranged in a lower position with respect to the folding unit, when compared with the known packaging machines. In this case, the packages are removed from the folding unit by the push arms of the transferring and up-ending unit when such packages have their axes in a position closer to the vertical direction if compared to the known filling machines. This allows having a better control during the transferring and up-ending phase. The packages, in fact, have to undergo a limited tilting, in order to be tipped from the withdrawal position, in which they are released from the folding unit, to the final position, in which their axes are arranged along a vertical direction.

BRIEF DESCRIPTION OF THE DRAWINGS

A preferred, non-limiting embodiment of the present invention will be described by way of example with reference to the accompanying drawings, in which.

DETAILED DESCRIPTION OF PREFERRED EMBODIMENTS

Figure 1:
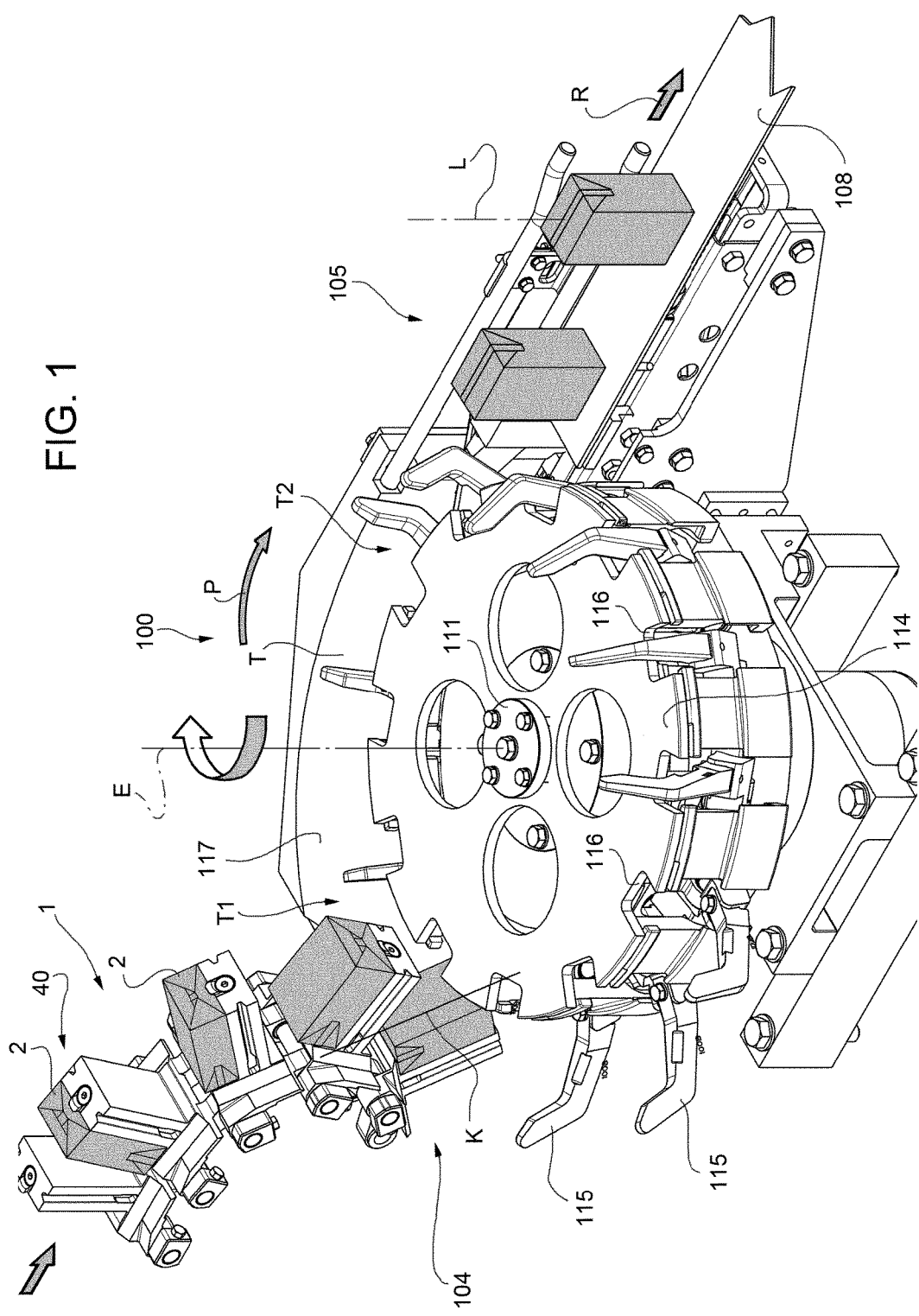
FIG. 1 shows a partial perspective view, with parts removed for clarity, of a folding unit in accordance with the present invention for producing packages of pourable food products from sealed pillow packs and of a transferring and up-ending unit.

Number 1 in FIG. 1 indicates as a whole a folding unit of a packaging machine (not shown) for continuously producing parallelepiped-shaped sealed packages 2 of a pourable food product, such as pasteurized or UHT milk, fruit juice, wine, etc., from a known tube of packaging material (not shown).

The tube is formed in known manner upstream from unit 1 by longitudinally folding and sealing a known web (not shown) of heat-seal sheet material, which comprises a layer of paper material covered on both sides with layers of heat-seal plastic material, e.g. polyethylene. In the case of an aseptic package 2 for long-storage products, such as UHT milk, the packaging material comprises a layer of oxygen-barrier material, e.g. aluminium foil, which is superimposed on one or more layers of heat-seal plastic material eventually forming the inner face of the package contacting the food product.

The tube of packaging material is then filled with the food product for packaging, and is sealed and cut along equally spaced cross sections to form a number of pillow packs 3 (FIG. 4), which are then transferred to unit 1 where they are folded mechanically to form respective packages 2.

Figure 2:
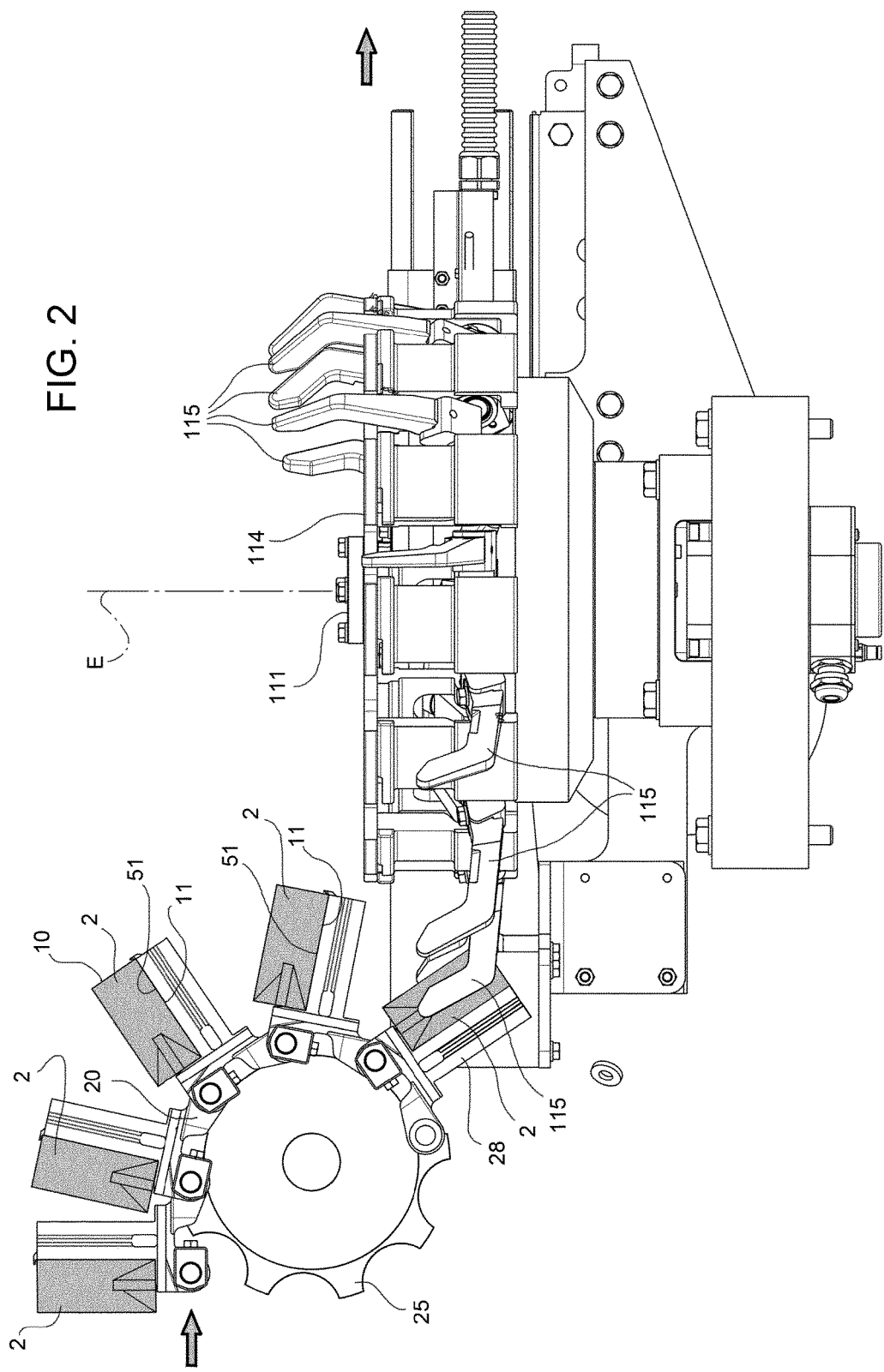
FIG. 2 shows a partial side view of the folding unit and of the transferring and up-ending unit of FIG. 1, with parts removed for clarity.
Figure 3:
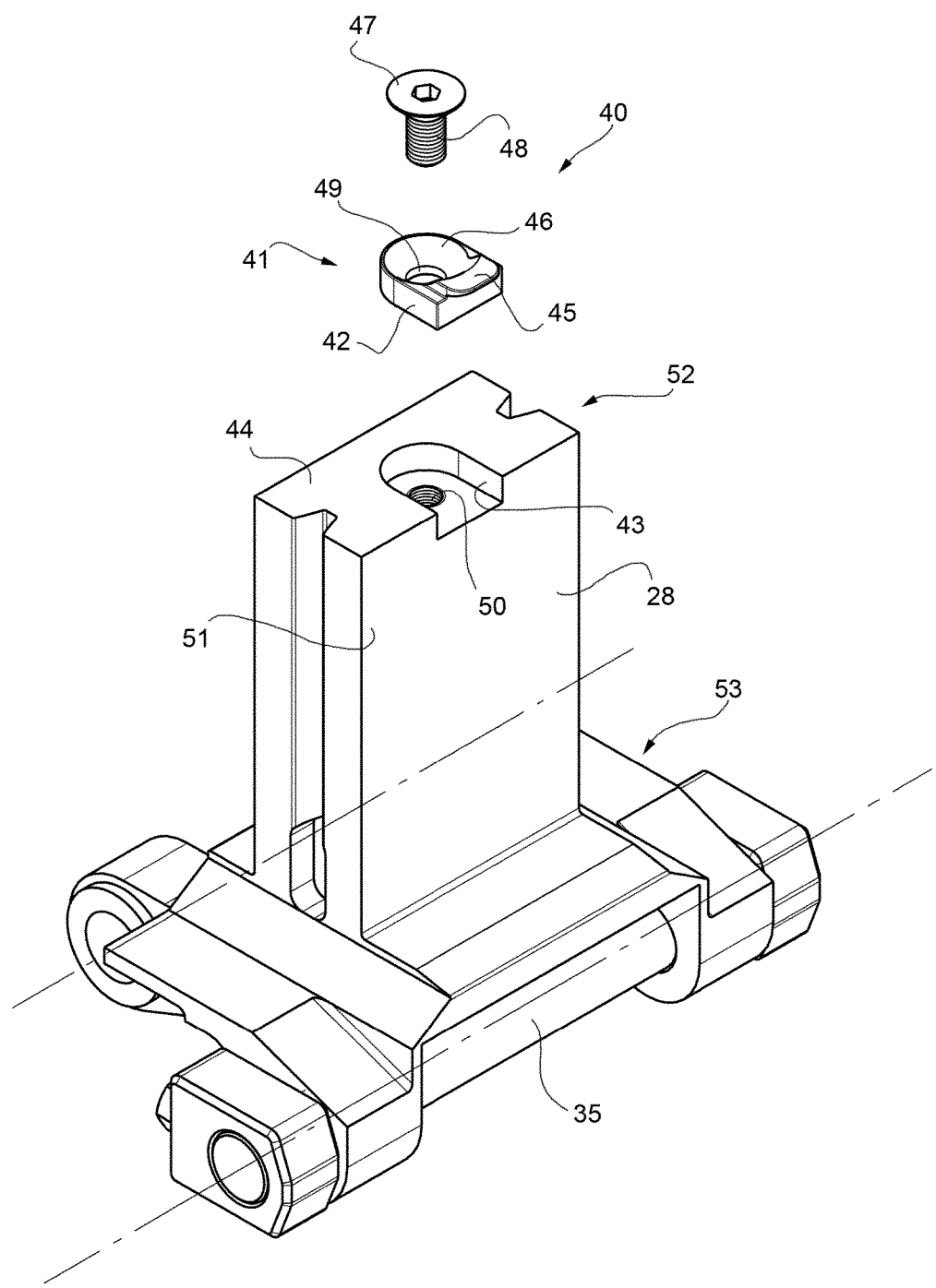
FIG. 3 shows a larger-scale detail of a plate of the folding unit provided with a retention element.
Figure 4:
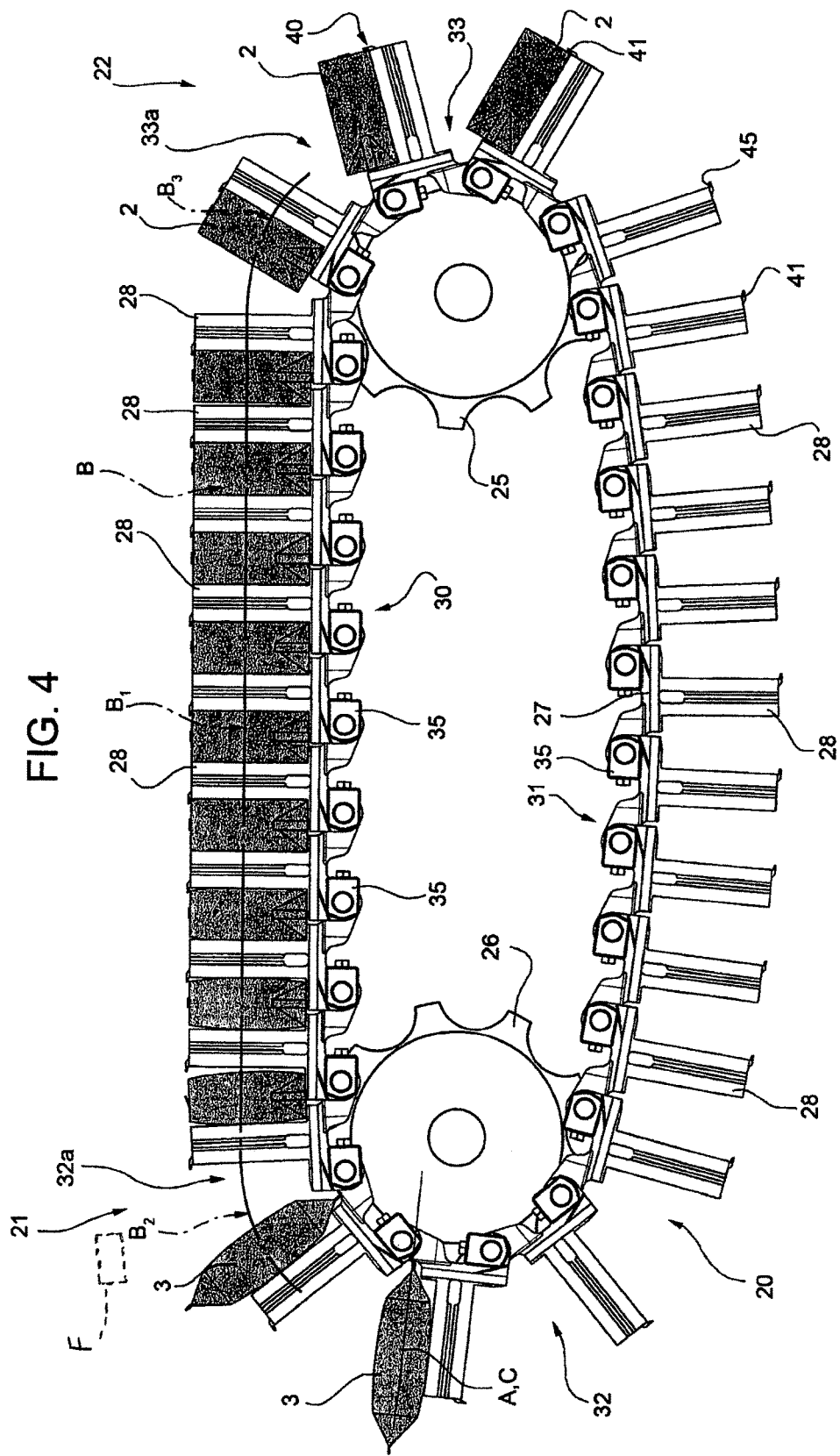
FIG. 4 shows side view of the folding unit and of the transferring and up-ending unit of FIG. 1, with parts removed for clarity.

With reference to FIGS. 1, 2 and 4, unit 1 substantially comprises a conveyor 20 for feeding packs 3 continuously along a predominantly straight horizontal forming path B from a supply station 21 to an output station 22 (both shown only schematically) and folding means (schematically identified as F in FIG. 4) for folding packs 3, in particular at least one end portion of packs 3, whilst packs 3 are carried by the conveyor 20, to obtain packages 2. The folding means are known from prior art and, therefore, they are not shown and disclosed in detail. For example, the folding means may comprise a fixed elongated guide member and folding elements as explained above.

Conveyor 20 comprises at least one gear and, in the example shown, a drive gear 25 and a driven gear 26; and an articulated chain 27 looped about and meshing with gears 25, 26, and supporting a number of plates 28, for example flat rectangular plates, each of which projects from chain 27 and cooperates with and pushes a pack 3 to feed it along path B.

Chain 27 comprises a straight horizontal top branch 30; a bottom branch 31 substantially parallel to branch 30; and two curved C-shaped portions 32, 33, which are positioned with their concavities facing, connect branches 30 and 31, and the middle portions of which define supply station 21 and output station 22 respectively.

Path B comprises a straight main portion $B_1$ defined by branch 30 of chain 27; and two, respectively supply and output, curved end portions $B_2$, $B_3$ defined by respective top portions 32a, 33a of portions 32, 33 of chain 27 extending between corresponding stations 21, 22 and branch 30. Branch 30 and portions 32a, 33a of portions 32, 33 therefore define a conveying portion of chain 27 to convey packs 3 from station 21 to station 22, while branch and the remaining portions of portions 32, 33 define a return portion of chain 27 to feed plates 28 from station 22 to station 21.

Chain 27 comprises a number of articulated links 35 defined by substantially flat rectangular bodies, from which respective plates 28 project perpendicularly.

Given the structure of conveyor 20, plates 28 are positioned vertically along portion $B_1$ of path B.

At supply station 21, each pack 3 is fed onto conveyor 20 in a feed direction C, coaxial with an axis A of pack 3.

Number 100 in FIGS. 1 and 2 indicates as a whole a transferring and up-ending unit for tipping the packages 2.

Transferring and up-ending unit 100 is known and, therefore, it will be described only to the extent that is necessary for the understanding of the invention.

Transferring and up-ending unit 100 feeds a succession of packages 2 continuously along a path P extending from an in-feed station 104 to an out-feed station 105, and simultaneously up-ends packages 2 continuously from an in-feed position, in which they are positioned with axes A oriented in a direction K, into an out-feed position, in which they are positioned with respective axes A oriented in a direction L crosswise to direction K. With reference to the embodiment shown, direction K is sloped relative to a horizontal plane and direction L is vertical.

Transferring and up-ending unit 100 receives packages 2 continuously and successively at in-feed station 104 from conveyor 20, and feeds them, in the out-feed position, to an output conveyor 108 at out-feed station 105. Output conveyor 108 moves the packages 2 along a substantially straight path R tangent to an end portion of path P.

Transferring and up-ending unit 1 comprises a number of push arms 115 for removing respective packages 2 from conveyor 20 at in-feed station 104 and feeding them along path P to out-feed station 105; and a guide 117 which cooperates with packages 2 along path P to up-end them from the in-feed position to the out-feed position.

Path P is arc-shaped about an axis E and extends along an angle of about 90° from in-feed station 104 to out-feed station 105.

Transferring and up-ending unit 100 also comprises:
- a drive shaft 111 rotating continuously about axis E and powered by an electric motor of the packaging machine in known manner not shown; and
- a wheel 114 of axis E, fitted to shaft 111 rotatably about axis E, and supporting the push members 115, which are hinged to wheel 114.

Push arms 115 rotates together with wheel 114 around axis E and oscillate with respect to wheel 114 between a first operating position, in which they remove the packages 2 from folding unit 1, to a second operating position, in which—after delivering the packages 2 to the conveyor 108—are received into slots 116, obtained in the wheel 114.

Push arms 115 are provided at their ends opposite to the ends which interact with packages 2 with cam followers (not shown) that interact with a fixed cam (not shown), so that the fixed cam drives the push arms 115.

Guide 117 is curved, extends substantially along path P, on the outside of wheel 114, and cooperates with packages 2 to ease them from the in-feed to the out-feed position.

Furthermore, guide 117 defines a supporting and slide surface T for packages 2, which extends substantially along path P and slopes gradually from a portion T1, parallel to direction B and adjacent to in-feed station 104, to a substantially flat, vertical out-feed portion T2 parallel to direction L and adjacent to out-feed station 105.

The folding unit 1 further comprises holding means, or retention means 40 arranged for keeping the packages 2 on the plates 28 before and during transferring of the packages 2 from the folding unit 1 to the transferring and up-ending unit 100.

Retention means 40 comprises a plurality of holding elements, or retention elements 41, each associated with a corresponding plate 28. Each retention element 41 is arranged at an end portion 52 of the corresponding plate 28 opposite to a further end portion 53 at which the plate 28 is connected to the conveyor 20. Each retention element 41 comprises a body 42 arranged to be received into a seat 43 obtained in an end surface 44 of the plate 28. The retention element 41 also comprises an appendix 45 arranged for cooperating with a package 2 carried by the plate 28. The body 42 is provided with a recess 46 adapted for receiving a screw 47 that connects the retention element 41 to the plate 28. The screw 47 is provided with an elongated threaded portion 48 that passes through an opening 49 obtained in the bottom portion of the recess 46 and mates with a corresponding threaded hole 50 obtained in the bottom portion of the seat 43.

When the retention element 41 is fixed to the corresponding plate 28 the body 42 is received into the seat 43 and the appendix 45 is substantially flush with the end surface 44 and projects from the plate 28 in a direction arranged transversally, in particular perpendicularly, with respect to a side surface 51 of the plate 28. The side surface 51 is arranged to interact with a side wall 11 of package 2. The appendix 45 is arranged to interact with an end wall 12 of the package 2. In particular, in the embodiment show, since the packages carried by the conveyor 20 are arranged in an upside down configuration, the appendix 45 interacts with a bottom wall of the packages 2.

During operation, packs 3 are fed to conveyor 20 and—as conveyor 20 carries them along path P—the folding means fold packs 3, in particular end portions thereof, so as to form packages 2.

When a package 2 reaches output station 22, i.e. the region where the folding unit 1 cooperates with the transferring and up-ending unit 100, a push arm 115 interacts with the package 2 in order to remove the package 2 from the corresponding plate 28.

Before and during the removal step, the retention element 41 prevents the package 2 from falling from plate 28 or sliding down along plate 28, so that the position of the package 2—at the point in time the push arm 115 contacts it—is uniquely set and constant for each plate 28, and at every working cycle. At the same time, since the appendix 45 is arranged transversally, in particular substantially perpendicularly, with respect to the side surface 51, the retention element 41 does not obstruct the removal of the package 2 from the plate 28 by means of the push arm 115.

Subsequently, the push arm 115 delivers the package 2 to the output conveyor 108.

Since the retention means 40 prevent the packages 2 from sliding downwards along the plates 28, the transferring and up-ending unit 100 may be arranged in a lower position with respect to the folding unit 1 if compared with the known packaging machines.

In this case, the angle formed by the direction K with a horizontal plane, i.e. the angle formed by the axes A of the packages 2 with a horizontal plane when the packages 2 are removed from the folding unit 1, is greater than in the case of the known packaging machines. This allows a better handling of the packages 2 by the push arms 115. The packages 2, in fact, in order to reach the final position in which their axes A are arranged vertically must be turned, or tipped, to a lesser extent than in the known packaging machines. In other words, the packages 2 are removed from the folding unit 1 when they are in a withdrawal configuration closer to the final configuration, in which they are delivered to output conveyor 108.

The invention claimed is:

1. Folding unit for producing packages of pourable food products from sealed packs, comprising a movable conveying member that conveys the sealed packs along a predominantly straight horizontal path and folding means for folding at least one end portion of said sealed packs, whilst said sealed packs are conveyed by said conveying member, to obtain said packages, said conveying member carrying a plurality of plates such that a first end of each plate is connected to the conveyor member, each plate possessing a second end at an end of the plate opposite the first end, each plate being configured to receive a sealed pack and to deliver a package to a transferring and up-ending unit arranged downstream of the folding unit, and retention means for keeping said packages on said plates, the retention means comprising a plurality of retention elements, each retention element being fixed to the second end of a respective one of the plates, the transferring and up-ending unit comprising a push-arm associated with one of the plates and that interacts with the package on the one plate to remove the package from the one plate, wherein said retention element comprises an appendix projecting transversally with respect to a side surface of said plate and said folding unit comprises a body provided with said appendix and received into a seat obtained in an end surface of said plate.

2. Folding unit according to claim 1, wherein said retention means are so configured as to keep said packages on said plates before, and during, transferring of said packages from said folding unit to said transferring and up-ending unit.

3. Folding unit according to claim 1, and further comprising an output station in which said packages are removed from said folding unit, said retention means being so configured as to prevent said packages from sliding downwards on said plates at said output station.

4. Folding unit according to claim 1, wherein said appendix is so configured as to interact with an end wall of said package.

5. Folding unit according to claim 1, wherein said side surface is so configured as to interact with a side wall of said packages.

6. Folding unit according to claim 1, wherein said appendix is substantially flush with said end surface.

7. Folding unit according to claim 1, and further comprising a screw for connecting said body to said plate.

8. Folding unit for producing packages of pourable food products from sealed packs, the folding unit comprising:
    a movable conveyor that conveys the sealed packs from a supply station toward an output station at which the package is outputted to a transferring and up-ending unit, the conveyor including a predominantly straight horizontal path between the supply station and the output station;
    folding means for folding at least one end portion of each of the sealed packs while the sealed packs are conveyed by the conveying member toward the output station to obtain the packages;
    a plurality of plates each configured to receive one of the sealed packs at the supply station and convey the sealed pack along the predominantly straight horizontal path toward the output station;
    each of the plates possessing oppositely disposed first and second ends, the first end of each of the plurality of plates being supported by the conveyor so that the plates move together with the conveyor; and
    a retention element separate from and connected to the second end of each of the plurality of plates to keep the package on the plate before and during transferring of the package to the transferring and up-ending unit, each of the retention elements being fixed in position relative to the respective plate so that a position of the retention element relative to the respective plate remains the same as the sealed pack is received on the plate and is conveyed along the predominantly straight horizontal path toward the output station and as the package is released from the plate at the output station.

9. Folding unit according to claim 8, wherein each retention element is configured to keep the packages on the plates before, and during, transferring of said packages from said folding unit to said transferring and up-ending unit.

10. Folding unit according to claim 8, wherein each retention element comprises an appendix projecting transversally with respect to a side surface of the respective plate.

11. Folding unit according to claim 10, wherein the appendix is configured to interact with an end wall of the package.

12. Folding unit according to claim 8, wherein the transferring and up-ending unit comprises a push-arm that is associated with each of the plurality of plates and that interacts with the package on the respective plate to remove the package from the respective plate.

13. Folding unit for producing packages of pourable food products from sealed packs, the folding unit comprising:
    a movable conveyor that conveys the sealed packs from a supply station toward an output station at which the package is outputted to a transferring and up-ending unit, the conveyor including a predominantly straight horizontal path between the supply station and the output station;
    folding means for folding at least one end portion of each of the sealed packs while the sealed packs are conveyed by the conveying member toward the output station to obtain the packages;
    a plurality of plates each possessing oppositely disposed first and second ends, the first end of each of the plurality of plates being supported by the conveyor so that the plates move together with the conveyor from the supply station to the output station;
    each of the plurality of plates possessing a side surface that receives and is contacted by one of the sealed packs at the supply station so that the sealed pack is conveyed along the predominantly straight horizontal path toward the output station by the plate moving together with the conveyor;
    a retention element positioned in a recess at the second end of each of the plurality of plates to keep the package on the plate before and during transferring of the package to the transferring and up-ending unit, each retention element including a portion that projects beyond the side surface of the respective plate to overlie an end wall of the package.

14. Folding unit according to claim 13, wherein the transferring and up-ending unit comprises a push-arm that is associated with each of the plurality of plates and that interacts with the package on the respective plate to remove the package from the respective plate.

* * * * *